United States Patent
Wang et al.

(10) Patent No.: US 8,837,434 B2
(45) Date of Patent: Sep. 16, 2014

(54) METHOD FOR TRANSMITTING SHORT SIGNALING IN MAC-E PDU

(75) Inventors: Hong Wang, Beijing (CN); Gaoke Du, Beijing (CN); Xiaoqiang Li, Beijing (CN)

(73) Assignees: Samsung Electronics Co., Ltd (KR); Beijing Samsung Telecom R & D Center (CN)

( * ) Notice: Subject to any disclaimer, the term of this patent is extended or adjusted under 35 U.S.C. 154(b) by 1764 days.

(21) Appl. No.: 11/792,272

(22) PCT Filed: Dec. 27, 2005

(86) PCT No.: PCT/KR2005/004581
§ 371 (c)(1),
(2), (4) Date: Jun. 11, 2009

(87) PCT Pub. No.: WO2006/071054
PCT Pub. Date: Jul. 6, 2006

(65) Prior Publication Data
US 2011/0103351 A1    May 5, 2011

(30) Foreign Application Priority Data

Dec. 29, 2004 (CN) .......................... 2004 1 0104654

(51) Int. Cl.
*H04B 7/216* (2006.01)
*H04W 72/04* (2009.01)
*H04W 72/12* (2009.01)
*H04W 28/06* (2009.01)

(52) U.S. Cl.
CPC ........ *H04W 72/1284* (2013.01); *H04W 28/065* (2013.01)

USPC .......................................................... 370/335

(58) Field of Classification Search
CPC . H04W 72/04; H04W 72/02; H04W 72/1284; H04W 72/1236; H04W 72/1268
USPC .................. 370/310, 328, 329, 335, 345, 349
See application file for complete search history.

(56) References Cited

U.S. PATENT DOCUMENTS

| 6,813,506 | B1   | 11/2004 | Song |
| 6,904,016 | B2 * | 6/2005  | Kuo et al. ...................... 370/235 |
| 7,318,187 | B2 * | 1/2008  | Vayanos et al. ................ 714/776 |
| 7,512,099 | B2 * | 3/2009  | Ameigeiras et al. ........... 370/331 |
| 7,525,908 | B2 * | 4/2009  | Olsson et al. .................. 370/229 |

(Continued)

FOREIGN PATENT DOCUMENTS

| KR | 1020010073237 | 8/2001 |
| KR | 1020040048167 | 6/2004 |
| KR | 1020050082658 | 8/2005 |

*Primary Examiner* — Chi Pham
*Assistant Examiner* — Robert Lopata
(74) *Attorney, Agent, or Firm* — The Farrell Law Firm, P.C.

(57) ABSTRACT

A method for transmitting a short signaling in a Media Access Control-e Packet Data Unit (MAC-e PDU) includes sending control information bits incorporated with padding bits of the MAC-e PDU considering the padding bits from a User Equipment (UE) to a Node B, and sending a scheduling signaling from a service Node B to the UE according to the control information bits. Scheduling request information is transmitted with the existing padding bits. If every Transmission Time Interval (TTI) has padding bits, the UE may send the scheduling request signaling to Node B in every TTI. Therefore, the reference is provided for the Node B, and no extra load is caused to the system.

16 Claims, 6 Drawing Sheets

(56) References Cited

U.S. PATENT DOCUMENTS

| | | | |
|---|---|---|---|
| 7,551,596 B2* | 6/2009 | Kim et al. | 370/349 |
| 7,746,833 B2* | 6/2010 | Terry | 370/335 |
| 7,860,065 B2* | 12/2010 | Oishi et al. | 370/335 |
| 7,864,719 B2* | 1/2011 | Chun et al. | 370/310 |
| 7,929,410 B2* | 4/2011 | Hepler et al. | 370/208 |
| 8,089,879 B2* | 1/2012 | Hu et al. | 370/235 |
| 2003/0095519 A1 | 5/2003 | Kuo et al. | |
| 2004/0057461 A1* | 3/2004 | Dawidowsky et al. | 370/468 |
| 2004/0120273 A1* | 6/2004 | Border et al. | 370/310 |
| 2005/0053088 A1 | 3/2005 | Cheng et al. | |
| 2005/0135291 A1* | 6/2005 | Ketchum et al. | 370/319 |
| 2005/0135403 A1* | 6/2005 | Ketchum et al. | 370/437 |
| 2006/0143444 A1* | 6/2006 | Malkamaki et al. | 713/160 |
| 2011/0194470 A1* | 8/2011 | Dick et al. | 370/310 |

* cited by examiner

METHOD FOR TRANSMITTING SHORT SIGNALING IN MAC-E PDU

BACKGROUND OF THE INVENTION

1. Field of the Invention

The present invention relates to a method for transmitting a short scheduling signaling through the padding bits in a Mac-e PDU in a WCDMA system that supports EUDCH.

2. Description of the Related Art

Standardization is to constitute the high rate and high quality packet service in the 3G mobile communication system. For instance, 3GPP is conducting standardization to HSDPA (High Speed Downlink packet Access) in order to improve the downlink data rate and 3GPP2 is conducting standardization to 1xEV-DV (Evolution-Data and Voice). 3GPP also goes on to an enhanced uplink data channel (EUDCH) in order to improve the volume and coverage of uplink. Compared with the uplink DCH of Re199/4/5, the EUDCH is superior in that a mechanism of HARQ (Hybrid Automatic Retransmission Request) is introduced in and the TTI (e.g., 2ms, the same as that of HSDPA) shorter than that of the uplink DCH of Re199/4/5 is considered for. TTI is defined as a transmission time interval to transmit data from a transmission channel to a physical channel.

Figure 1:
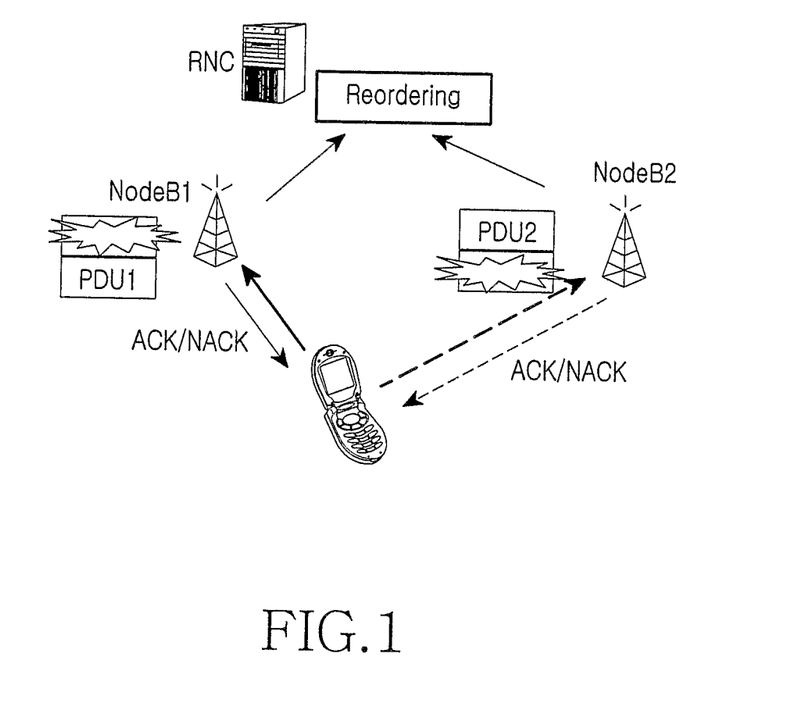
FIG. 1 illustrates a data transmission process in EUDCH.

The data transmission process in EUDCH is illustrated in FIG. 1. Whether to retransmit EUDCH data or not is under the control of the base station (hereinafter simplified as Node B).

When receiving the data from the UE and in case that the received data can be decoded correctly, Node B sends a correct acknowledgement (hereinafter simplified as ACK) to the UE indicating that data has been received correctly and new data may be transmitted in the next same process. The correctly received data is transmitted to a RNC, and the data is sorted by the RNC. If the received data may not be decoded correctly, Node B sends a NAK to the UE indicating that the data should be retransmitted in the next same process. Node B combines the retransmitted data with the just previous data received. Now, if the decoding may be conducted correctly, Node B transmits the correctly decoded data to the RNC.

Node B may schedule an absolute transmission rate of the UE in uplink. By sending an absolute scheduling command to the UE, Node B sets the transmission power of the UE, which is converted into the transmission rate. In addition, Node B also may perform relative scheduling to the rate that is being in service for the UE by sending the relative scheduling command to the UE to make it improve or reduce its transmission power or rate in current uplink by a preset step.

For the convenience of scheduling performed by Node B to the UE, it is necessary for the UE to inform Node B of some information. By far, two solutions may be adopted by the UE to inform Node B of some information. One is that the UE informs Node B of the information on the margin of power and the state of buffer area through a Media Access Control packet data unit (hereinafter MAC-e PDU). The packet containing the information on the margin of power and the state of buffer area is called a control packet, which is generally transmitted periodically. The other is that the UE sends the Rate Request message (hereinafter RR) to Node B via the channel of a physical layer, indicating whether the UE should improve its rate or reduce its rate and it is necessary to transmit RR in every TTI.

Figure 2:
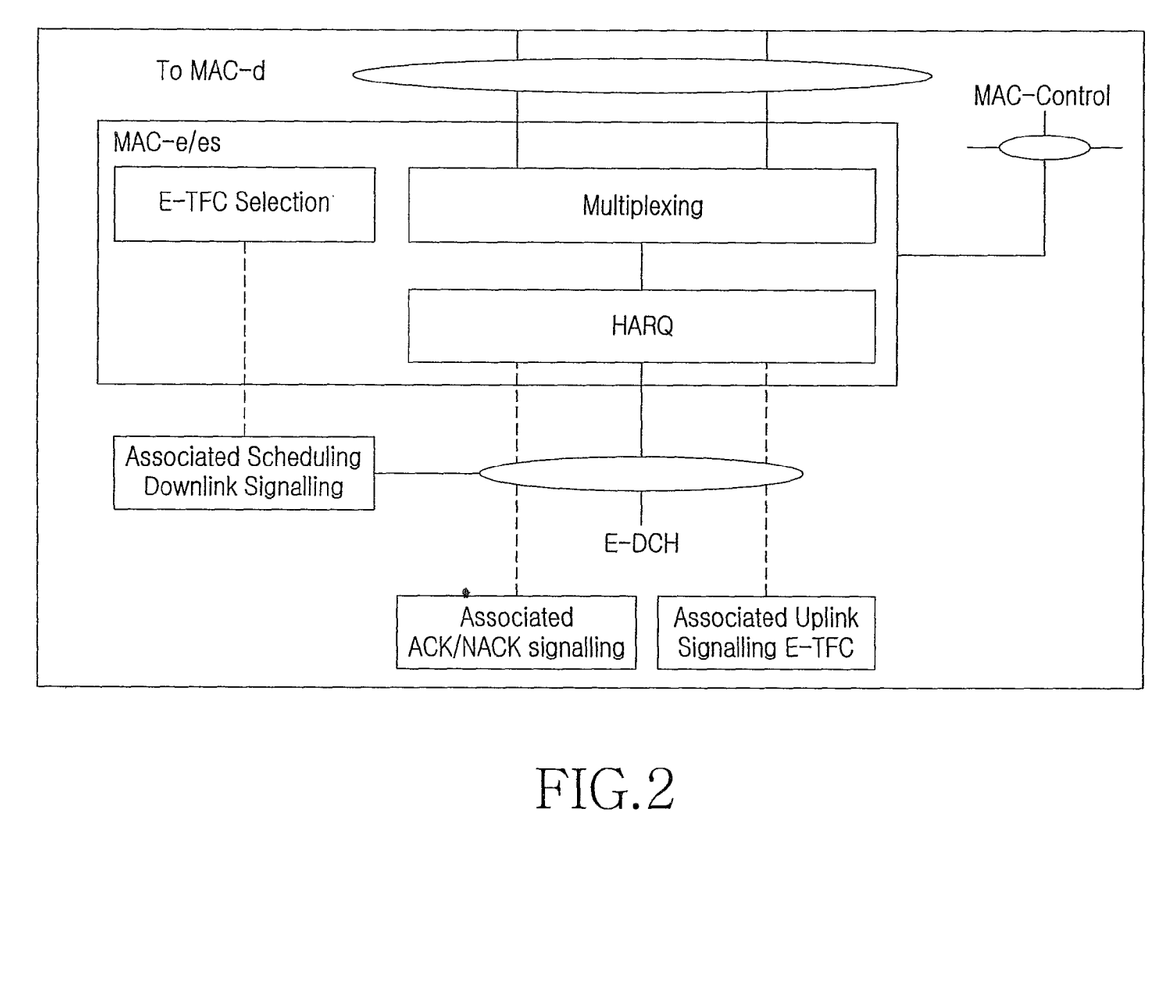
FIG. 2 shows a structure of Mac-e/es in a UE end.
Figure 3:
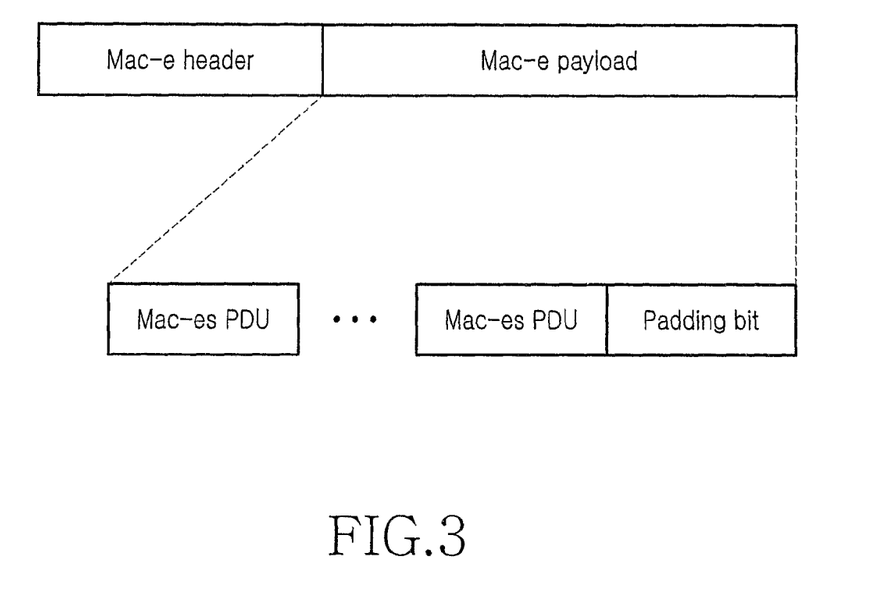
FIG. 3 illustrates a format of a Mac-e PDU.

For the UE side in the EUDCH, a new MAC name MAC-e/es is introduced in. FIG. 2 shows a structure of MAC-e/es of the UE side. After a TFC (Transport Format Combination) is selected, signaling related to scheduling needs to be generated. The present invention relates to the range before that the UE transmits the MAC-e/es packet to the physical layer after the TFC is well selected. The MAC-e/es packet transmitted to the physical layer is just a MAC-e PDU (Packet Data Unit). The length of the MAC-e PDU must meet the demand of a set of predefined TFC. A proper format for transmission is selected for the UE MAC layer according to the number of data bits and the power needed to be transmitted. If the number of data bits needed to be transmitted is less than that required in the format, it is necessary to add some padding bits. At present, all padding bits are padded with zeros. Because the state of the buffer area and the margin of power occupy many bits, the control packet containing the information on the state of the buffer area and the margin of power is called a long control packet hereinafter. FIG. 3 illustrates a format of the MAC-e PDU, including a header and a payload. The payload includes data bits and padding bits.

In the state of SHO (Soft Switching Over), the Node B that may send the absolute scheduling command is a service Node B of the UE, which determines the required uplink rate for users according to the power of UE and the volume of data needed to be transmitted. The service Node B may not only send the absolute scheduling signaling to control the maximum transmission rate of the UE, but also send the relative scheduling signaling to the UE to improve or reduce its transmission rate with a preset step. To make the service Node B learn about the transmission power margin of the UE and the data size in the buffer area, it is necessary for the UE to transmit a long control packet to the service Node B. If the service Node B does not receive this long control packet, the UE should retransmit it. The non-service Node B sends common signaling to inform the UEs of the other cells whether they should reduce their rates or not, and the service Node B does not mind whether it has received the long control packet or not regardless the improvement in rate of the UE.

Because the physical channel resource is limited, only the most important information may be transmitted through it. At present, since other more important information should be transmitted through the physical channel, RR may be impossible to be transmitted through it. Therefore, the service Node B may perform scheduling according to the information on power and buffer reported by other UEs without the transmission of RR. However some limitation lies in this solution in the case that the UE makes a report periodically. Great changes have possibly taken place to the buffer area of the UE between the periods of two cycles. Therefore, the scheduling performed by Node B to the UE refers to earlier and inaccurate information thus it is possible that the resource allocated to the UE could not meet the demand of the UE.

SUMMARY OF THE INVENTION

An object of the present invention is to provide a method for transmitting short signaling in a MAC-e PDU.

To achieve the object mentioned above, a method for transmitting a short signaling in a Mac-e PDU includes:

sending control information bits incorporated with padding bits of the MAC-e PDU considering the padding bits from a User Equipment(UE) to a Node B, and sending a scheduling signaling from a service Node B to UE according to the control information bits.

Scheduling request information is transmitted by the existing padding bits. If every TTI has padding bits, the UE may send the scheduling request signaling to Node B in every TTI. Therefore, not only the reference is provided for the Node B, and no extra load is caused to the system.

DETAILED DESCRIPTION OF THE PREFERRED EMBODIMENTS

With a try-best transmission method in the present invention, as long as the Mac-e PDU includes some padding bits, some short control bits such as the RR bit can be transmitted to provide Node B with enhanced information for its scheduling without extra load to the existing air interface.

In the light of the present invention, short control bits such as the RR bit may be thoroughly transmitted through the Mac-e PDU. When the Mac-e PDU has some padding bits suitable for the transmission of short control bits, this short control bits may be transmitted and if the Mac-e PDU has no padding bit or the length of the padding bits is not fit for the shot control bits, no control bit but the padding bits are transmitted. Now, taking the RR bit as an example to describe the solution of the present invention.

Figure 4:
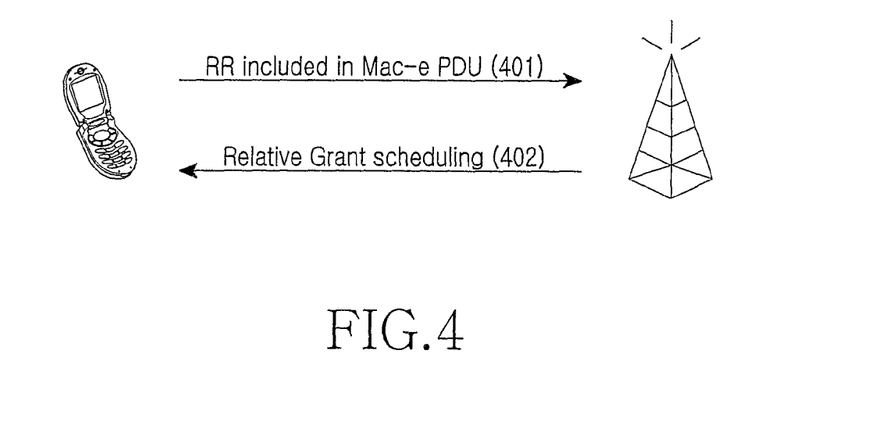
FIG. 4 is block diagram according to the present invention.

FIG. 4 illustrates a block diagram according to the present invention.

In step 401, the UE sends the RR bit to Node B by incorporating them with the MAC-e PDU.

In step 402, once the service Node B receives the RR bit, with a reference to the received RR bit, it sends (if necessary) the scheduling signaling to the UE to change its data rate.

In each TTI, if some data is needed to be transmitted, the UE determines the format (TFC) that data is transmitted within this TTI according to the power and the data size. If some padding bits are needed to be added in, the UE determines whether the data rate within the next TTI needs to be improved or not. If so, all the padding bits in the Mac-e PDU are padded with "1"s, otherwise, one or some of the padding bits should be filled with "1"(s), others with "0"s. Another practicable solution is to incorporate the RR bit with the header of the Mac-e PDU. This solution modifies the format of the header of the existing Mac-e PDU. Therefore, the key point of present invention is that the short control signaling is transmitted using the existing padding bits.

The long control packet provides information for the scheduling of service Node B. If the service Node B has not received the long control packet but all non-service Node Bs have correctly responded to the long control packet, it is necessary for the UE to retransmit this long control packet in the next idle TTI till the service Node B sends the acknowledgement information to the UE. Though the RR bit belongs to the control packet, the RR bit control packet is different from the long control packet in that: if the service Node B has not received the Mac-e PDU containing the RR bit but the non-service Node Bs have correctly responded to the Mac-e PDU containing the RR bit, it is unnecessary for the UE to retransmit the earlier RR bit in the next TTI.

The solution of the present invention is not limited to the transmission of the RR bit. It is also suitable for the transmission of other short control information in case that the short control information meets the requirements that: 1) the length of the short control information is finite and relatively invariable; 2) the short control information provides enhanced information to the scheduling of the service Node B. With this information, the service Node B may perform more accurate scheduling to the UE and the service Node B may also perform scheduling to the UE according to its saved control information without this information. The solution of the present may be applied to the transmission of all short scheduling control information that satisfies both the requirements above, i.e., in the case that the length of the padding bits is fit for the short control information, the transmission of the information may be done by using the padding bits. If there is no padding bit or the length of the padding bits is less than that necessary for the control packet, no short control information will be transmitted within this TTI, but no affection will be caused to the service Node B in performing scheduling to the UE. For instance, if it is necessary for the UE to report the ratio (which may be a few bits long and provides information to the service Node B in performing scheduling to the UE) between the EUDCH channel and the EUDCH channel's power in each TTI, this power ratio may be transmitted using the solution proposed in the present invention. If there have some padding bits within a certain TTI, this power ratio is transmitted; and if there has no padding bit or the length of the padding bits is less than that necessary for this ratio, this ratio will not be transmitted in this TTI.

According to the present invention, the solution that utilizes the padding bits to thoroughly transmit the control information is also suitable for the transmission of long control information, e.g., the transmission of the data size of the UE's buffer area. In general, the long control information is transmitted periodically and a periodic report will be configured for the UE by the network. If the report period does not begin yet but the length of the padding bits included in the Mac-e PDU within a certain TTI that is approaching this report period is suitable for the transmission of long control information, then the transmission of long control information may be conducted. However if the service cell does not receive this Mac-e PDU, this long control information should be retransmitted using the Mac-e PDU packet that meets the demand of the transmission of long control information. If no Mac-e PDU suitable for the transmission of long control information exists during the time of the report period, the transmission of the long control information has to be conducted in the report period.

Embodiment

To avoid repeated description, the transmission of RR bit is selected as an example to describe the embodiment of the present invention in the following. The method for transmitting RR bit is also suitable for the transmission of the short control information that satisfies both requirements described just previously. The RR bit may be included in either the position of the padding bits of the Mac-e PDU, or in the position of the header bits of the Mac-e PDU. Known functions or components are omitted to make the description clear.

Figure 5:
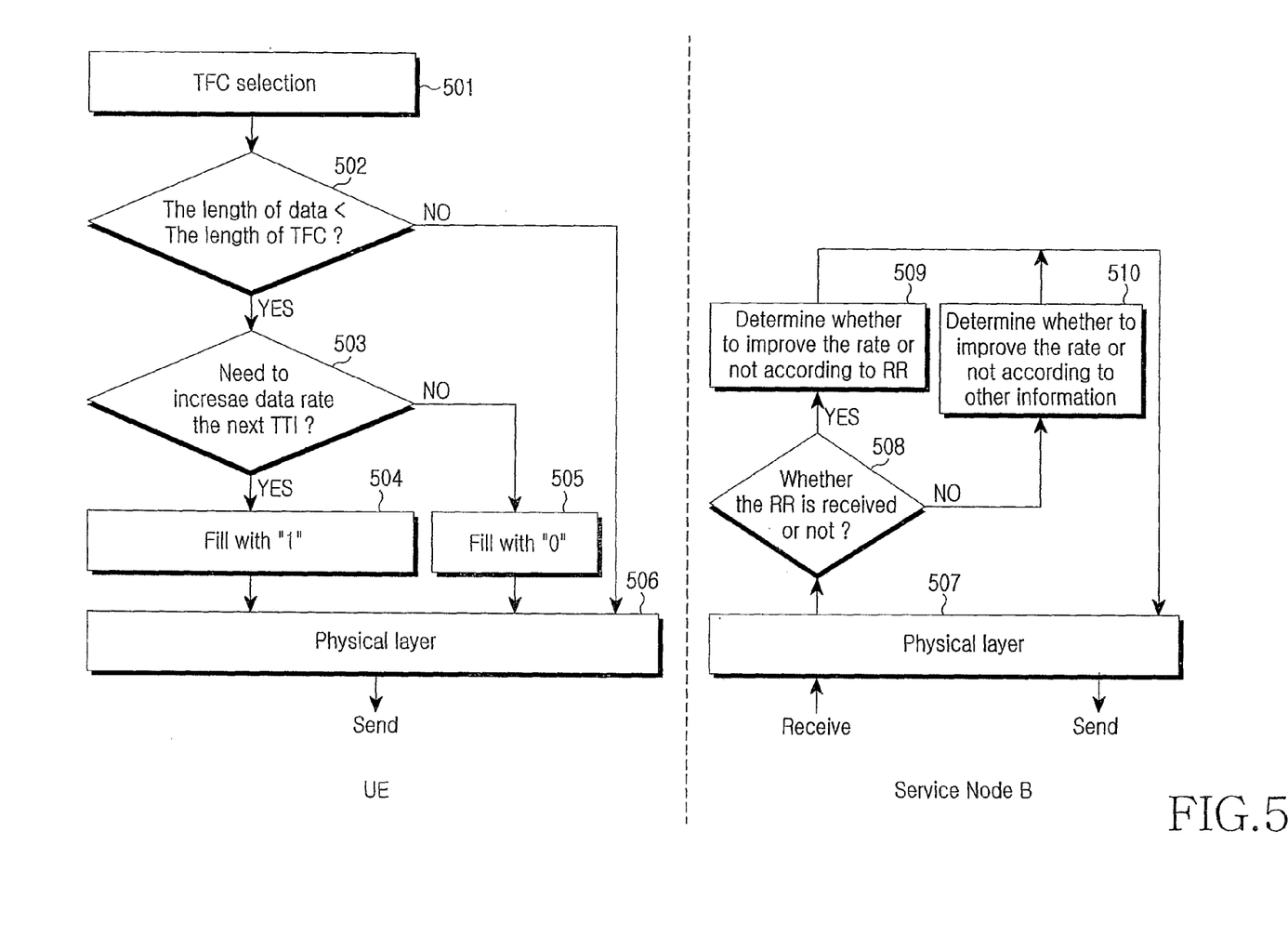
FIG. 5 shows a flowchart that RR is padded in a Mac-e PDU.

FIG. 5 illustrates a flowchart that the UE includes the RR in the position of the padding bits of the Mac-e PDU and the service Node B receives this Mac-e PDU according to the present invention.

In step 501, the UE calculates the format (TFC) for data transmission. In this step, detailed description has been made in the existing system. Thus no detail will be given in the present invention.

In step 502, if data (which includes data of the corresponding header) is shorter than the TFC, it is determined to be padded with bits and the procedure goes to step 503. If the length of data (which includes data of the corresponding header) is equal to that of the TFC, no bit should be padded, goes to step 506 to directly send the packet to the physical layer for the convenience of the transmission through the air interface.

In step 503, whether the rate is needed to be improved or not in the next TTI is determined. If so, the procedure goes to step 504; if not, then it goes to step 505.

Figure 6:
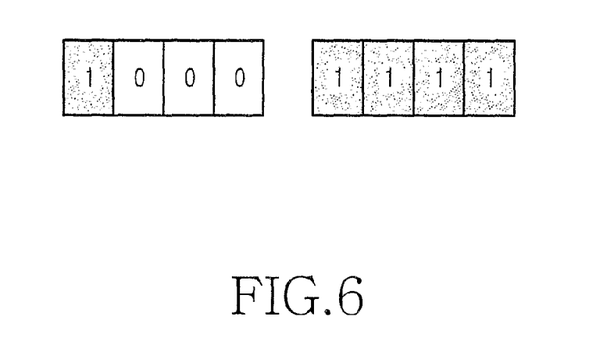
FIG. 6 shows a format in which RR is padded in a Mac-e PDU.

In step 504, the padding bits are filled with "1". The filling format is shown in FIG. 6, then the procedure goes to step 506.

In step 505, the padding bits are filled with "0", then the procedure goes to step 506.

In step 506, the well padded packet is delivered to the physical layer to perform transmission through the air interface.

In step 507, the service Node B receives the MAC-e PDU sent from the UE.

In step 508, whether the MAC-e PDU includes the RR bit is determined and Node B judges whether the MAC-e PDU includes the RR bit or not according to the indication of the header of the MAC-e PDU and the indication of TFC (i.e., the TFCI). According to the TFCI sent from the physical layer, Node B learns about the transmission format that the UE adopts in this TTI and accordingly learns about the length of the MAC-e PDU. Header information of MAC-e PDU indicates the stop position of the data and according to the length of MAC-e PDU and the stop position of the data, Node B judges whether there exists any padding bit or not. If any, it is thought that the MAC-e PDU have contained the RR bit. If the MAC-e PDU includes the RR bit, goes to step 509 and if the MAC-e PDU includes no RR bit, goes to step 510 to determine whether to send the scheduling command of downlink to the UE or not according to other saved information. In step 509, after receiving the RR bit, the service Node B determines whether to send the downlink signaling to the UE or not according to the value of the receive RR bit so as to schedule the rate of the UE. If the padding bits are padded with "1", Node B considers that the RR bit is "1", which indicates that the UE wants to improve the rate. If possible, it is necessary for Node B to send the downlink scheduling signaling to the UE through the physical channel to make the UE improve its uplink rate. If the RR bit is "0", it indicates that the UE does not want to improve its rate.

In step 510, the service Node B receive no RR bit and it determines whether to send signaling to schedule the rate of the UE or not according to such information as the saved the power margin of the UE, the state of the buffer area and other information. If necessary, it sends the scheduling signaling to UE through the physical channel.

Step 510, the service Node B receive no RR bit and it determines whether to send signaling to schedule the rate of the UE or not according to such information as the saved the power margin of the UE, the state of the buffer area and other information. If necessary, it sends the scheduling signaling to UE through the physical channel.

FIG. 6 is a schematic diagram of the position where the RR bit is included in the padding bits of the Mac-e PDU. That RR value 1 indicates it is necessary for the UE to improve its current data rate and "1" stands for one preset step, either the step of rate or the step of power. The RR may occupy either the first bit or several bits of the padding bits, or even the entire padding bits.

Figure 7:
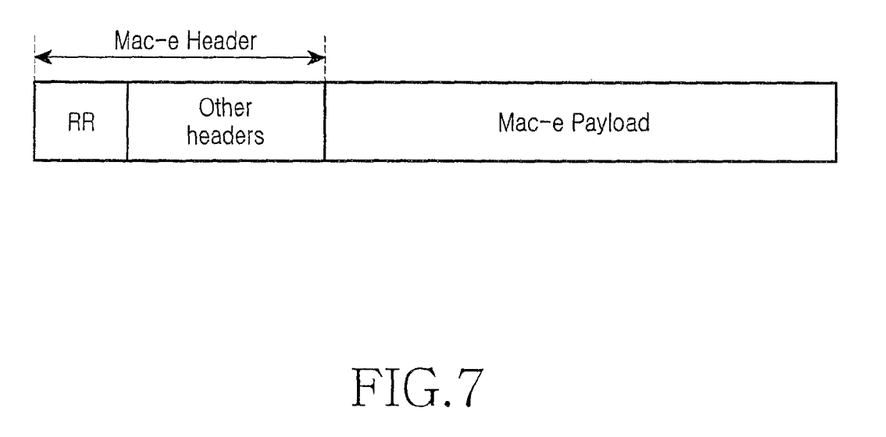
FIG. 7 illustrates a format of the RR header in a Mac-e PDU.

The short control information bits may be included in the header bits of the Mac-e PDU. FIG. 7 shows a schematic diagram that the RR (which is taken as an example) bit is included in the header bits of the Mac-e PDU. Short RR bits may be denoted in a fixed format.

Figure 8:
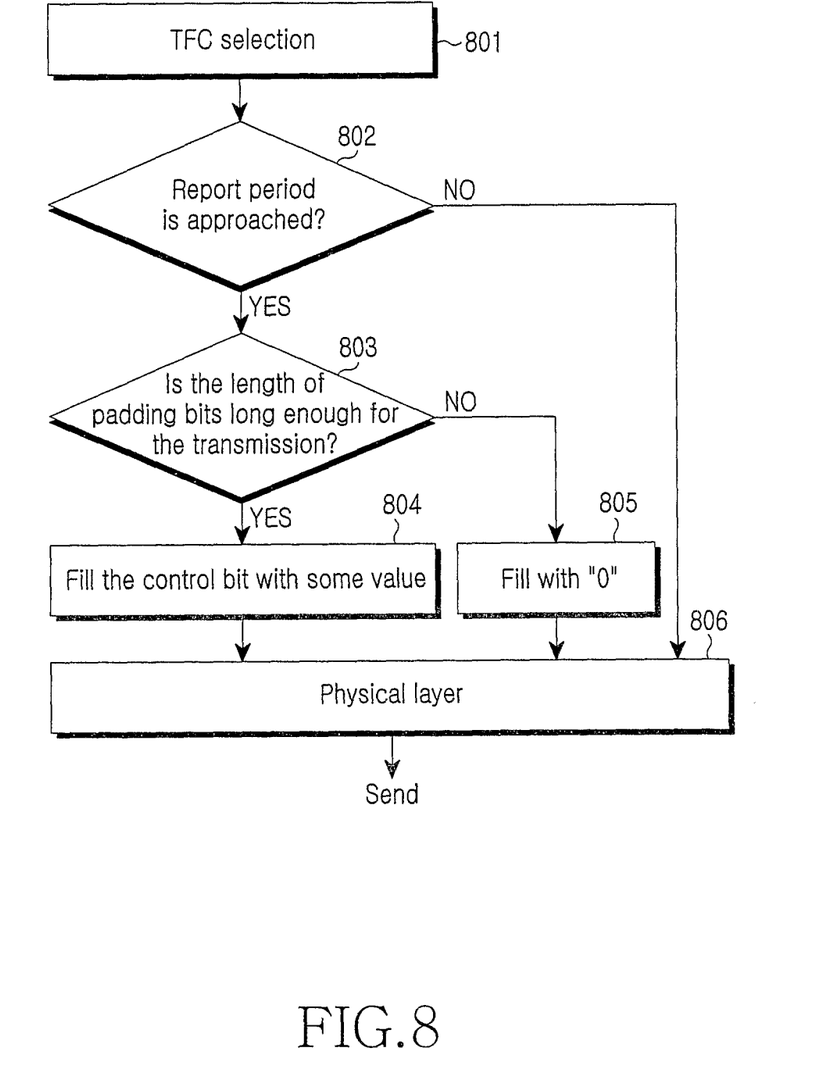
FIG. 8 illustrates a flowchart that a UE transmits long control bits.

FIG. 8 illustrates a flowchart of the transmission of long control information according to the present invention.

In step 801, the UE calculates the format (TFC) for data transmission. In this step, detailed description has been made in the existing system. Therefore no detail will be given in the present invention.

In step 802, the UE judges whether the report period approaches or not. At first, it is necessary to define the concept of "approach". It may be done by the protocol scheduling, or the configuration of the RNC, or according to the implementation. For instance, that UE thinks report period approaches may be defined by protocol to be the moment ten or less TTIs to the preset report period of the RNC. In this case, it is necessary to perform steps 803 through 805; otherwise, directly go to step 806.

In step 803, whether the length of the padding bits is suitable for transmission of long control bits or not is determined. If so, the procedure goes to step 804; if not, it goes to step 805.

In step 804, the padding bits are filled with the long control information bits and then the procedure goes to step 806.

In step 805, the padding bits are filled with "0" and then the procedure goes to step 806.

In step 806, the well padded MAC-e PDU packet is delivered to the physical layer to perform transmission through the air interface.

What is claimed is:

1. A method for transmitting control information in a Media Access Control-enhanced Packet Data Unit (MAC-e PDU), the method comprising:
    determining a data size of a Transport Format Combination (TFC) selected by a User Equipment (UE);
    including control information into the MAC-e PDU when a size of data and a header for the MAC-e PDU is shorter than the data size of the TFC; and
    sending, by the UE, the MAC-e PDU including the control information to a Node B,
    wherein the control information is used for scheduling in the Node B, and indicates a state of a buffer of the UE.

2. The method according to claim 1, further comprising:
    calculating the TFC for data transmission;
    padding data with bits if a size of data including a corresponding header is shorter than the data size of the TFC; and
    padding the padding bits with the control information bits if the length of the padding bits is suitable for the transmission of the control information bits.

3. The method according to claim 1, further comprising retransmitting the control information from the UE if a service Node B does not receive the control information within a Transmission Time Interval (TTI) but a non-service Node Bs receives the control information.

4. The method according to claim 1, wherein the control information is transmitted at an instant when a report period is approached.

5. The method according to claim 2, wherein the padding bits are filled with "1" if a data rate needs to be improved in a next Transmission Time Interval (TTI), and the padding bits are filled with "0" if the data rate does not need to be improved in the next TTI.

6. A method for receiving control information in a Media Access Control-enhanced Packet Data Unit (MAC-e PDU), the method comprising:
    receiving, by a Node B, the MAC-e PDU including control information from a User Equipment (UE); and sending scheduling signaling of a downlink through a physical channel to the UE according to the control information, wherein the control information is included into the MAC-e PDU when a size of data and a header for the MAC-e PDU is shorter than a data size of a Transport Format Combination (TFC) selected by the UE, and wherein the control information indicates a state of a buffer of the UE.

7. An apparatus of a User Equipment (UE) for transmitting control information in a Media Access Control-enhanced Packet Data Unit (MAC-e PDU), the apparatus comprising:

a processor which determines a data size of a Transport Format Combination (TFC) selected by a User Equipment (UE) and includes control information into the MAC-e PDU when a size of data and a header for the MAC-e PDU is shorter than the data size of the TFC; and a transmitter which sends the MAC-e PDU including the control information to a Node B, wherein the control information is used for scheduling in the Node B, and indicates a state of a buffer of the UE.

8. An apparatus of a Node B for receiving control information in a Media Access Control-enhanced Packet Data Unit (MAC-e PDU), the apparatus comprising:

a receiver which receives the MAC-e PDU including control information from a User Equipment (UE); and a transmitter which sends scheduling signaling of a downlink through a physical channel to the UE according to the control information, wherein the control information is included into the MAC-e PDU when a size of data and a header for the MAC-e PDU is shorter than a data size of a Transport Format Combination (TFC) selected by the UE, wherein the control information indicates a state of a buffer of the UE.

9. The method according to claim 1, wherein the control information is included into the MAC-e PDU when the size of the data and the header is shorter than the data size of the TFC and a size of the remaining bits excluding the size of the data and the header among the data size of the TFC is suitable for transmission of the control information.

10. The method according to claim 9, wherein the size of the remaining bits is determined to be suitable for transmission of the control information when the size of the remaining bits is larger than a predetermined value.

11. The method according to claim 6, wherein the control information is included into the MAC-e PDU when the size of the data and the header is shorter than the data size of the TFC and a size of the remaining bits excluding the size of the data and the header among the data size of the TFC is suitable for transmission the control information.

12. The method according to claim 11, wherein the size of the remaining bits is determined to be suitable for transmission the control information when the size of the remaining bits is larger than a predetermined value.

13. The apparatus according to claim 7, wherein the control information is included into the MAC-e PDU when the size of the data and the header is shorter than the data size of the TFC and the size of the remaining bits excluding the size of the data and the header among the data size of the TFC is suitable for transmission of the control information.

14. The apparatus according to claim 13, wherein the size of the remaining bits is determined to be suitable for transmission of the control information when the size of the remaining bits is larger than a predetermined value.

15. The apparatus according to claim 8, wherein the control information is included into the MAC-e PDU when the size of the data and the header is shorter than the data size of the TFC and the size of the remaining bits excluding the size of the data and the header among the data size of the TFC is suitable for transmission the control information.

16. The apparatus according to claim 15, wherein the size of the remaining bits is determined to be suitable for transmission the control information when the size of the remaining bits is larger than a predetermined value.

* * * * *